United States Patent [19]

Turgeon

[11] Patent Number: 5,099,378
[45] Date of Patent: Mar. 24, 1992

[54] CARRIER WITH EXTERNAL INTERLOCK FOR VIDEOCASSETTE

[75] Inventor: Thomas A. Turgeon, Fridley, Minn.

[73] Assignee: Minnesota Mining and Manufacturing Company, St. Paul, Minn.

[21] Appl. No.: 398,069

[22] Filed: Aug. 24, 1989

[51] Int. Cl.[5] .......................................... G11B 23/02
[52] U.S. Cl. ..................................... 360/132; 242/199
[58] Field of Search ............... 360/132, 128, 94, 95; 242/195, 198, 199; 352/72, 78 R, 158

[56] References Cited

U.S. PATENT DOCUMENTS

| | | | |
|---|---|---|---|
| Re. 29,976 | 4/1979 | Schoettle et al. | 360/132 |
| 2,148,756 | 2/1939 | Keys | 242/55 |
| 3,066,880 | 12/1962 | Bauer | 242/55.13 |
| 3,104,843 | 9/1963 | Missriegler et al. | 242/55.13 |
| 3,188,091 | 6/1965 | Goodell | 274/11 |
| 3,227,387 | 1/1966 | Laa et al. | 242/55.13 |
| 3,672,603 | 6/1972 | Swain | 242/194 |
| 3,783,200 | 1/1974 | Jantzen et al. | 179/100.2 |
| 3,800,321 | 3/1974 | Bolick, Jr. | 360/94 |
| 3,900,171 | 8/1975 | Serizawa | 242/198 |
| 3,913,145 | 10/1975 | Wiig | 360/132 |
| 4,019,695 | 4/1977 | Waaram | 242/199 |
| 4,183,477 | 1/1980 | Iwase | 242/198 |
| 4,196,873 | 4/1980 | Kudoh | 242/195 |
| 4,232,840 | 11/1980 | Sugawara | 242/198 |
| 4,452,407 | 6/1984 | Ogata et al. | 242/198 |
| 4,470,560 | 9/1984 | Yoneya et al. | 242/198 |
| 4,476,505 | 10/1984 | Ogata et al. | 360/94 |
| 4,479,618 | 10/1984 | Okada et al. | |
| 4,524,926 | 6/1985 | Nemoto et al. | 242/198 |
| 4,536,810 | 8/1985 | Umeda | 360/94 |
| 4,566,048 | 1/1986 | Tokunaga et al. | 360/94 |
| 4,572,460 | 2/1986 | Hertrich | 242/195 |
| 4,602,300 | 7/1986 | Ogata et al. | 360/60 |
| 4,920,436 | 4/1990 | Novak | |

*Primary Examiner*—A. J. Heinz

[57] ABSTRACT

An interlock system for use with a two piece video cartridge/carrier video cassette for preventing insertion of the video cassette into a video tape machine, unless the tape interconnection is fully advanced onto the take-up reel.

2 Claims, 4 Drawing Sheets

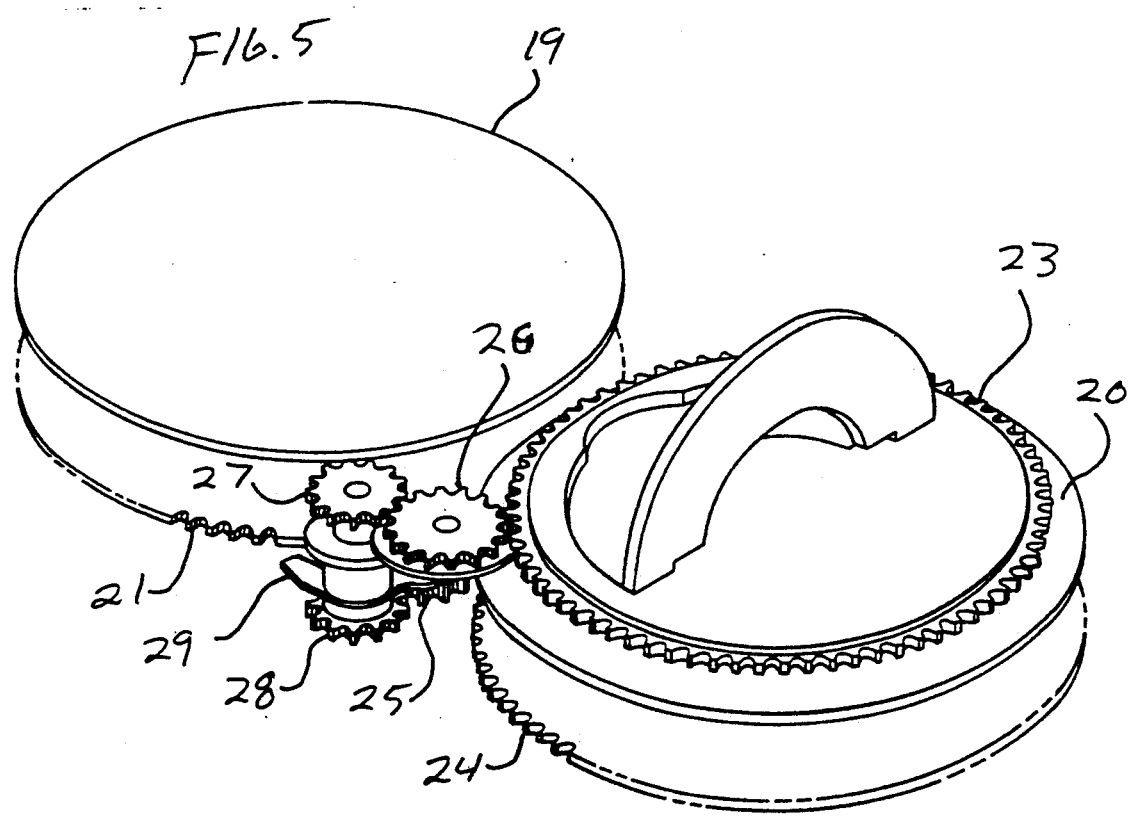

CARRIER WITH EXTERNAL INTERLOCK FOR VIDEOCASSETTE

The present invention relates to magnetic tape cartridges and carriers for use in videotape machines. The tape cartridge is inserted into a carrier which adapts the cartridge to a standard videocassette format.

Most home videotape machines use magnetic recording media supplied in the VHS videocassette format. The typical videocassette has a housing containing both a supply reel and a take-up reel. The magnetic tape is attached to the hubs of the two reels. The housing has several guide posts which cooperate to define the tape path for the videocassette. The tape path is protected by a door which is closed when the videocassette is outside of the machine. When the videocassette is inserted into the machine the tape transport mechanisms open the door to permit the magnetic media to engage the rotating heads of the machine.

Although the traditional VHS format is popular, it is not an efficient format for the storage of tape. The videocassette format includes an empty take up reel within the housing which reduces the density of information storage.

The present invention addresses several problems related to the use of a cartridge in a carrier to adapt the cartridge to the VHS format.

SUMMARY OF THE INVENTION

The present invention involves a two piece videocassette which is made up of a tape cartridge which may be inserted into a carrier to adapt the cartridge to the videocassette format. The invention teaches the use of a specialized winding mechanism interlock. The interlock is used to prevent insertion of the carrier into the videotape machine unless a tape interconnector is fully advanced onto a take-up reel.

The tape cartridge includes a supply of tape which terminates in a tape connector. This tape connector is coupled to a tether connector located within the carrier. The tether connector is connected to a leader or tether which is connected to the take-up reel located in the carrier. The insertion of the cartridge into the carrier completes the tape-tether interconnection. Once the cartridge is fully inserted into the carrier the operator will manually advance the interconnection to the take up reel to prepare the carrier for insertion into the videocassette machine.

The winding mechanism disclosed uses a manually operated thumb key which is attached to a gear train which rotates a clapper gear into engagement with either the take up reel or the supply reel depending on the direction of key rotation. The thumb key is used to advance the tape-tether interconnection onto the take-up reel located in the carrier. Once the tape-tether interconnection is advanced onto the take up reel the videocassette may be safely inserted into the videocassette machine. However if the interconnection has not been fully advanced to the take-up reel, the interconnector may contact the videotape machine heads which will result in damage to the head mechanism. The present invention teaches the use of a interlock tab which is actuated by the winding mechanism and which prevents carrier insertion unless the winding mechanism has been turned enough to insure that the tape-tether interconnector is advanced to the take-up side of the carrier.

BRIEF DESCRIPTION OF THE DRAWING

In the drawing, in which like reference numerals indicate corresponding structures throughout the views:

FIG. 5 is a perspective view of the carrier gear train.

DETAILED DESCRIPTION OF THE PREFERRED EMBODIMENT

In the following detailed description of the preferred embodiment, reference is made to an illustrative embodiment of the invention. It is to be understood that other embodiments may be utilized without departing from the scope of the present invention.

Pending U.S. patent application 07/343,851 filed 04/26/89 and pending U.S. patent application 07/353,826 filed 05/18/89 relate to the tape cartridge and carrier technology described herein. Each of these applications is incorporated by reference.

Figure 1:
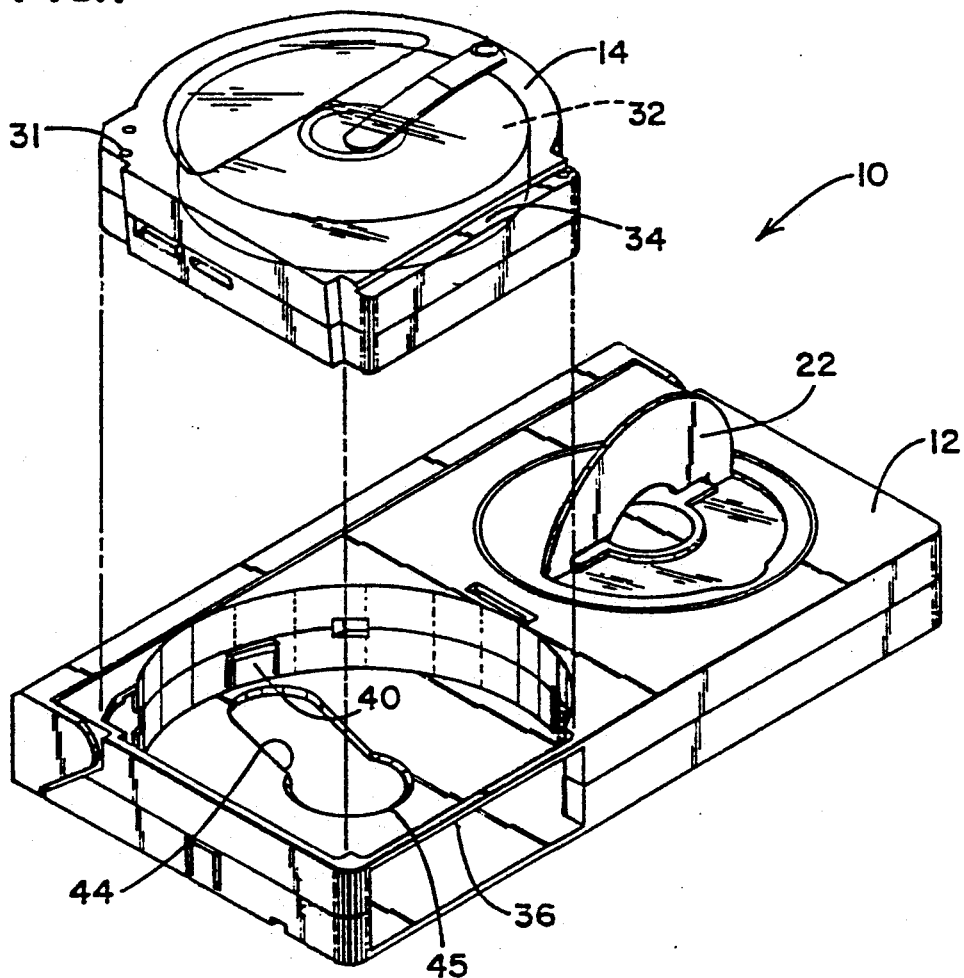
FIG. 1 is a perspective view of the carrier and the cartridge.

FIG. 1 depicts a cartridge 14 for insertion into a carrier 12. the insertion sequence begins by engaging ledge 34 of the cartridge with the cross support 36 of the carrier. Next, the cartridge is rotated into the home position depicted in FIG. 2. This insertion process causes a tape connector associated with the cartridge to engage a tether connector coupled to a take-up reel. The tape-tether interconnection is show in phantom view as 16 in FIG. 3A and FIG. 3B. This interconnection sequence is more fully described in commonly assigned, and incorporated U.S. patent applications.

Figure 2:
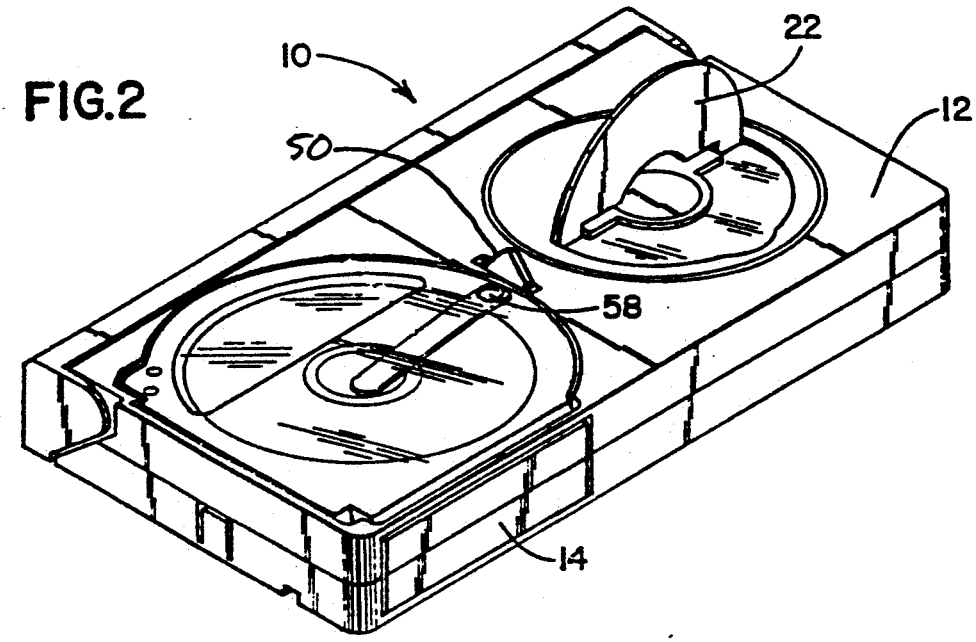
FIG. 2 is a perspective view of the cartridge inserted into the carrier.

A manually operated mechanism is provided in the carrier to advance the tape-tether interconnection 16 from the "home position" on the supply reel side of the carrier to the "play position" on the take-up reel side of the carrier. It is preferred to operate this mechanism through a collapsible thumb key 22. In FIG. 1 the key is shown in the collapsed position while FIG. 2 depicts the key in the operating position. In operation, the user will insert the cartridge into the carrier and then operate the thumb key to advance the interconnection 16 onto the take-up reel. Once the interconnection is on the take-up reel, the cartridge-carrier assembly may be introduced into the videocassette machine.

To prevent premature insertion of the carrier into the videocassette machine an interlock tab 50 is provided. The interlock tab emerges from the carrier as shown in FIG. 2 and this tab 50 intersects the videocassette carriage in the videocassette machine which prevents full insertion of the carrier. This tab is retracted into the carrier by the winding mechanism. The gear ratios selected for the winding mechanisms correspond to the movement of the tape-tether interconnection from the home position to the play position in four turns of the thumb key.

To remove the cartridge, the cartridge-carrier assembly 10 is removed from the videocassette machine at the end of the rewind cycle. The rewind cycle leaves the interconnection on the take-up side of the carrier in the play position. The user then elevates the thumb key 22 and rewinds the tape-tether interconnection 16 to the home position depicted in FIG. 3A. Once the interconnection is in the home position, thumb pressure through the aperture 45 will permit the user to rotate the cartridge out of the carrier.

Figure 3A:
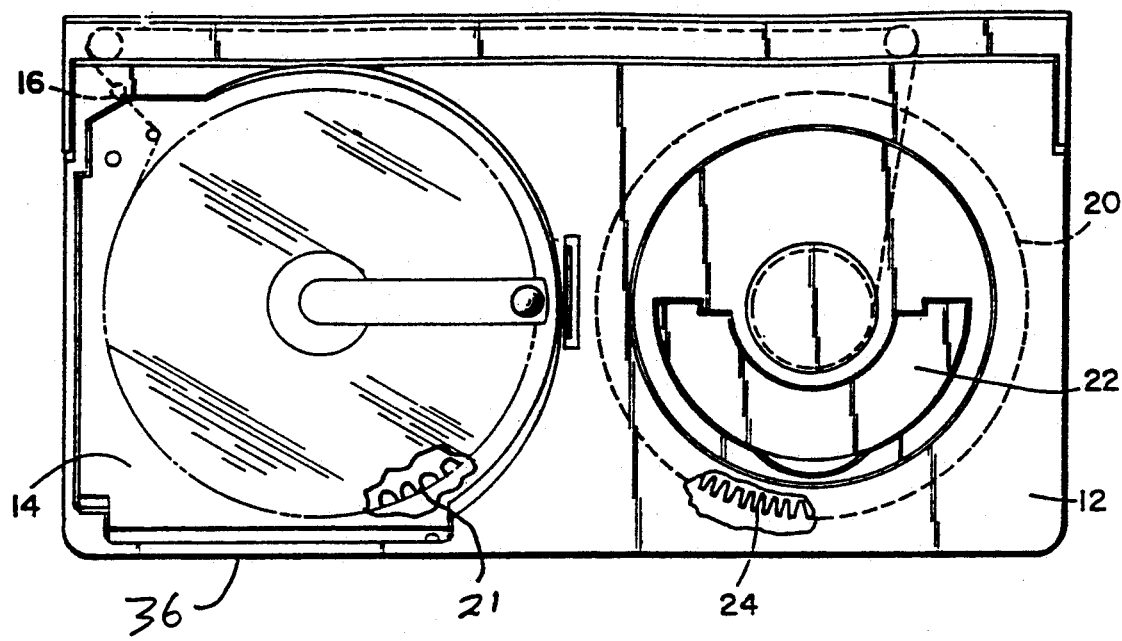
FIG. 3A is a top view of assembly with the tape-tether interconnection located near the supply reel.
Figure 3B:
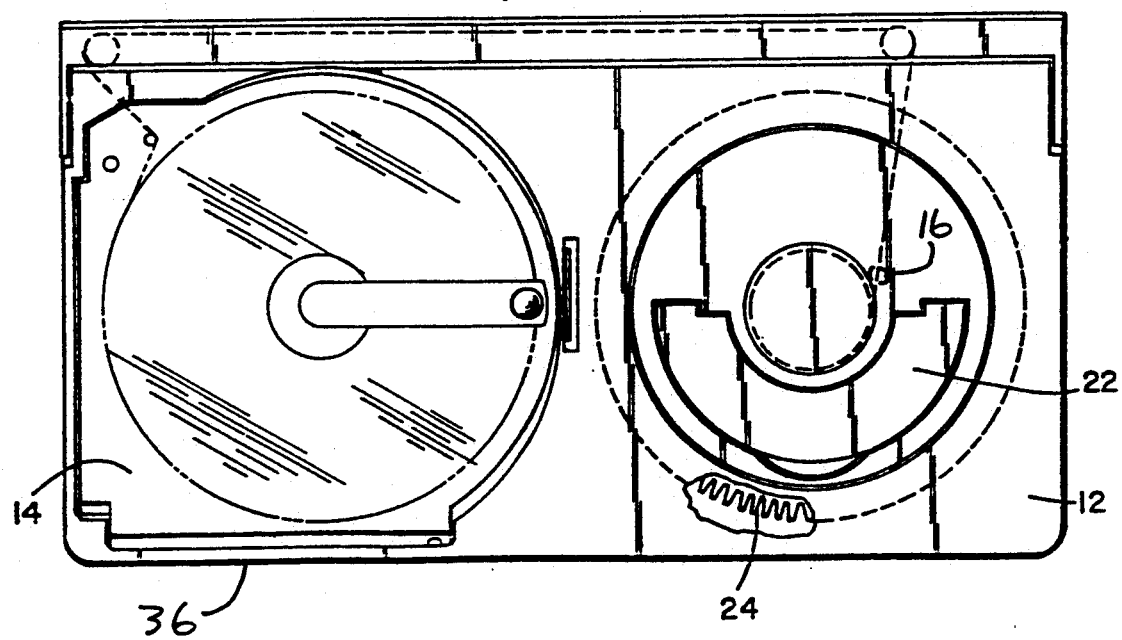
FIG. 3B is a top view of the assembly with the tape-tether interconnection advanced to the take-up reel.

The thumb key 22 can apply torque to either the supply reel 32 or the take up reel as shown in FIG. 1. As shown in FIG. 3A the lower flange of the supply reel is a gear 21 while the lower flange of the take-up reel 32 is a gear 24. The clapper gear 25 engages either the supply gear 21 or the take-up gear 24 depending on the direction of thumb key rotation. Power from the thumb key is transmitted through a gear train which includes a thumb key ring gear 23. The ring gear engages an idle gear 26 which insures that clockwise rotation of the key advances the interconnection toward the take-up reel and that counterclockwise rotation of the key rewinds the interconnector toward the home position. Power from the idler gear is transmitted to a pair of transfer gears 27 and 28. The upper transfer gear 27 engages the idle gear 26. This transfer gear 27 is attached the lower transfer gear 28 through a mating D shaft spline.

Figure 4A:
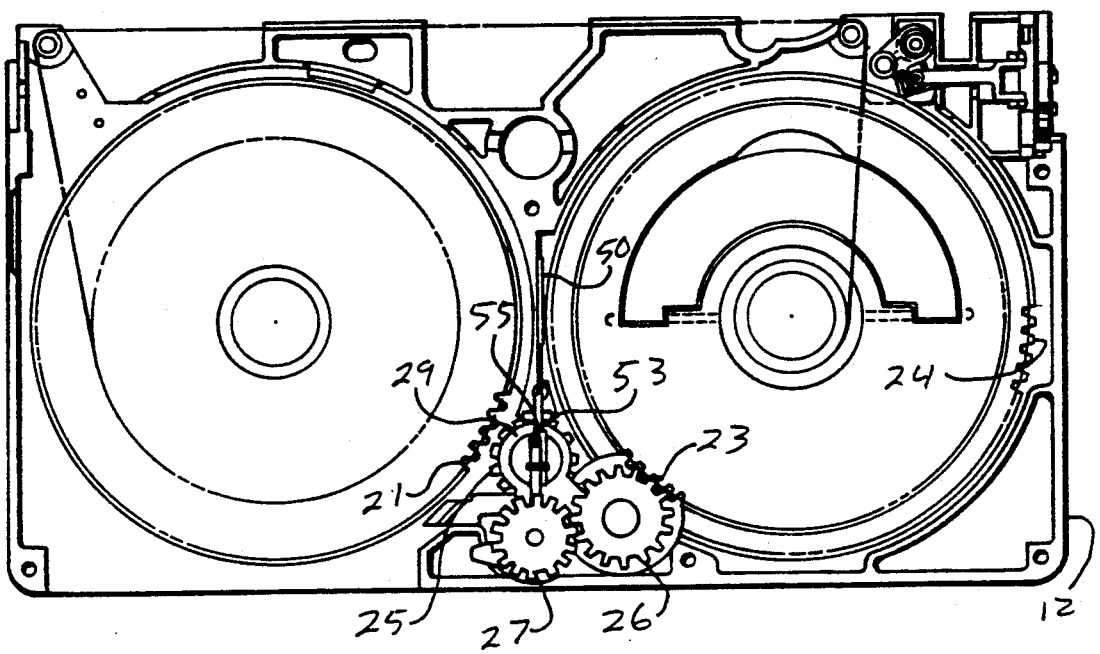
FIG. 4A is a top view of the carrier.
Figure 4B:
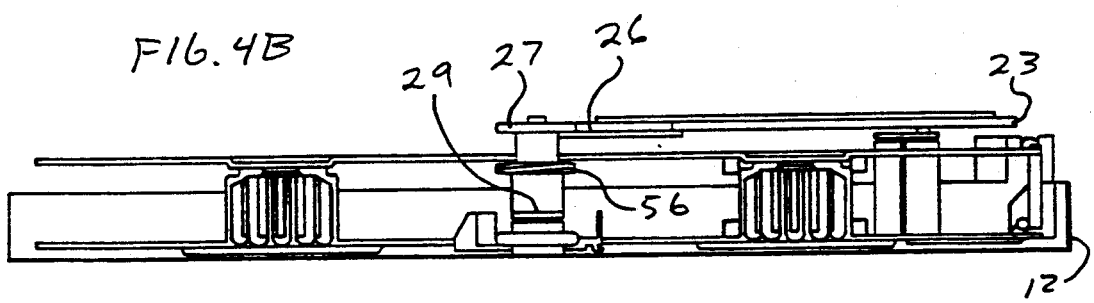
FIG. 4B is a side elevation of the carrier.
Figure 4C:
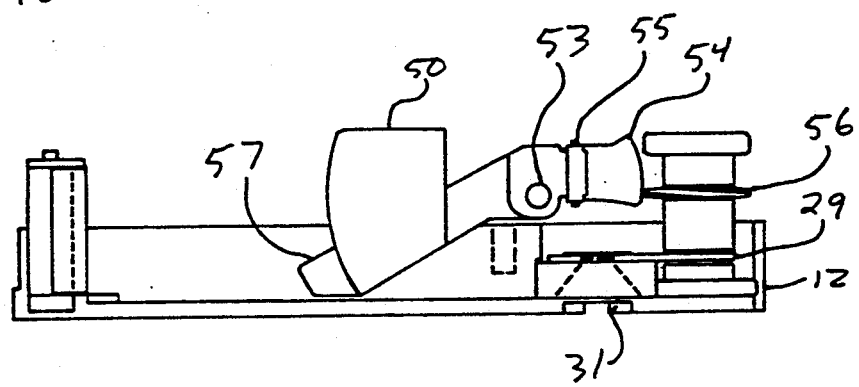
FIG. 4C is a side elevation of the carrier.

The clapper gear 25 is mounted on an arm 29 which may pivot around the axis of the transfer gear assembly. Rotation about this pivot will cause the clapper gear to engage either the supply gear 21 or the take up gear 24. A small amount of drag between the transfer gear assembly and the arm is required to apply torque to the arm to cause it to rotate. This torque may be supplied by a wave washer placed between the lower edge of the upper transfer gear 27 as seen in FIG. 4C. In the FIG. 4C the idler arm 29 is not shown for clarity.

In operation the user may advance or rewind tape through the key activated clapper gear. However once the carrier has been inserted into the videotape machine the tape transport will insert a pin into the aperture 31 which contacts the conical interior surface of the clapper gear 25 and disengages it from the reel gear.

The interlock tab 50 pivots about a tab shaft 53. A sector tab 54 is coupled to the interlock tab to retract it into the housing. The sector tab is mounted on the interlock tab through a pivot pin 55 which has its axis orthogonal to the axis of pivot 53. During clockwise rotation of the thumb key 22 the worm gear 56 engages the sector tab 54. Rotation of the transfer gear assembly causes the interlock tab 50 to rotate into the retracted position. Continued rotation of the transfer gear assembly drives the sector gear 54 off of the worm 56 and the interlock tab 50 remains within the carrier.

Counterclockwise rotation of the key 22 causes the sector gear 54 to rotate about pivot pin 55 which disengages the sector from the worm. This action permits the spring loaded interlock tab 50 to instantly emerge from the carrier. The tab 50 pivots about tab shaft 53 until stop 57 engages the carrier housing. The various gear ratios and pitches are selected such that it requires four complete turns of the key 22 to completely retract the interlock tab 50. This corresponds to the number of turns required to move the tape-tether interconnection from the home position to the play position. Consequently, a retracted interlock tab 50 always indicates that the interconnection is on the take-up side of the carrier and that the carrier may be safely inserted into the videocassette machine.

What is claimed is:

1. A two piece videocassette of the type formed by the insertion of a tape cartridge into a cooperating carrier, comprising:
   a tape cartridge,
   a supply reel located within said cartridge for storing tape, said tape having a first tape end and a second tape end,
   a tape connector attached to said first tape end of said tape, said second tape end being attached to said supply reel,
   a tape cartridge carrier for receiving said tape cartridge, said tape cartridge carrier having a housing, said housing having an interior surface and an exterior surface, said exterior surface defining a carrier form factor shape, said interior surface defining a tape cartridge receiving aperture,
   said take-up reel located laterally within said tape cartridge carrier housing, adjacent said tape cartridge receiving aperture, said take-up reel adapted for rotation in said housing, and adapted for receiving and storing tape,
   guidepost means located within said tape cartridge carrier housing for defining a tape path within said tape cartridge carrier, said tape path extending from the location of said take-up reel to a position proximate said tape cartridge receiving aperture,
   a tether having a first tether end and a second tether end, said first tether end being attached to said take-up reel and extending along said tape path,
   a tether connector attached to said second tether end of said tether,
   said tape cartridge and said tape cartridge carrier together forming means for forming a tape-tether interconnection when said tape cartridge is inserted into said tape cartridge receiving aperture formed in said carrier,
   winding means for driving said supply reel to rewind said tape-tether interconnection toward said supply reel and for driving said take-up reel to advance said tape-tether interconnection toward said take-up reel,
   interlock means coupled to said drive means for altering said carrier form factor shape of said tape cartridge carrier housing to prevent insertion of said carrier into a player/recorder unit until said drive means has advanced said tape-tether interconnection a preset distance along said tape path.

2. The two piece videocassette of claim 1 wherein said interlock means further comprises:
   an interlock tab mounted for rotation about a tab pivot within said carrier housing adjacent an aperture formed in said carrier for altering said carrier form factor shape when said interlock tab extends out of said aperture,
   interlock tab actuation means coupled to said winding means for rotating said interlock tab into said carrier when said winding means drives said take-up reel, a predetermined amount.

* * * * *

UNITED STATES PATENT AND TRADEMARK OFFICE
CERTIFICATE OF CORRECTION

PATENT NO. : 5,099,378

DATED : March 24, 1992

INVENTOR(S) : Thomas A. Turgeon

It is certified that error appears in the above-identified patent and that said Letters Patent is hereby corrected as shown below:

Column 1, line 59, after the word "However", please insert --,--

Column 2, line 1, please delete the word "DRAWING" and insert therefor --DRAWINGS--

Column 2, line 3, please delete the word "drawing" and insert therefor --drawings--

Column 2, line 26, please delete the words "patent application" and insert therefor --Patent Application--

Column 2, line 27, please delete the words "patent application" and insert therefor --Patent Application--

Column 2, line 38, please delete the word "show" and insert therefor --shown--

Column 2, line 41, please delete the words "patent application" and insert therefor --Patent Application--

Column 3, line 23, after the word "attached", please insert the word --to--

UNITED STATES PATENT AND TRADEMARK OFFICE
CERTIFICATE OF CORRECTION

PATENT NO. : 5,099,378
DATED : March 24, 1992
INVENTOR(S) : Thomas A. Turgeon

It is certified that error appears in the above-indentified patent and that said Letters Patent is hereby corrected as shown below:

Column 3, line 36, after the word "However", please insert --,--.

Signed and Sealed this

Seventh Day of September, 1993

Attest:

BRUCE LEHMAN

Attesting Officer    Commissioner of Patents and Trademarks